(12) United States Patent
Lee

(10) Patent No.: US 9,249,767 B2
(45) Date of Patent: Feb. 2, 2016

(54) FLUID ACTIVATING APPARATUS

(76) Inventor: Heuk Gyu Lee, Gwangju (KR)

( * ) Notice: Subject to any disclaimer, the term of this patent is extended or adjusted under 35 U.S.C. 154(b) by 320 days.

(21) Appl. No.: 13/991,847

(22) PCT Filed: Dec. 12, 2011

(86) PCT No.: PCT/KR2011/009549
§ 371 (c)(1),
(2), (4) Date: Jun. 5, 2013

(87) PCT Pub. No.: WO2012/078013
PCT Pub. Date: Jun. 14, 2012

(65) Prior Publication Data
US 2013/0255795 A1    Oct. 3, 2013

(30) Foreign Application Priority Data

Dec. 10, 2010   (KR) .................. 10-2010-0125945

(51) Int. Cl.
*F02M 53/00*   (2006.01)
*F02M 27/00*   (2006.01)
*F02B 51/04*   (2006.01)
*F02M 27/04*   (2006.01)

(52) U.S. Cl.
CPC ............... *F02M 53/00* (2013.01); *F02B 51/04* (2013.01); *F02M 27/045* (2013.01); *Y02T 10/126* (2013.01); *Y10T 137/598* (2015.04)

(58) Field of Classification Search
CPC .......... F02M 3/00; F02M 27/045; F02B 1/04; Y02T 10/126; Y10T 137/598
See application file for complete search history.

(56) References Cited

U.S. PATENT DOCUMENTS 5,882,514 A  *  3/1999  Fletcher .................. 210/222
2012/0067802 A1 *  3/2012  Irvin ........................ 210/222

FOREIGN PATENT DOCUMENTS

| JP | 2002-364466 | 12/2002 |
| KR | 10-1998-0009842 | 4/1998 |
| KR | 20-0438821 | 3/2008 |

OTHER PUBLICATIONS

The Written Opinion of the International Searching Authority for PCT/KR2011/009549, dated Aug. 3, 2011.*
International Search Report of International Appl. No. PCT/KR2011/009549, dated Aug. 3, 2012.

* cited by examiner

*Primary Examiner* — David A Reifsnyder
(74) *Attorney, Agent, or Firm* — Novick, Kim & Lee, PLLC; Jae Youn Kim

(57) ABSTRACT

A fluid activating apparatus is provided. The apparatus is capable of changing a bonding structure of a fluid or allowing the fluid to be readily reacted by applying a strong magnetic field to the fluid, such as water or liquid fuel.

2 Claims, 7 Drawing Sheets

FLUID ACTIVATING APPARATUS

TECHNICAL FIELD

The present invention relates to a fluid activating apparatus. More particularly, the present invention relates to a fluid activating apparatus capable of changing a bonding structure of a fluid or allowing the fluid to be readily reacted by applying a strong magnetic field to the fluid, such as water or liquid fuel.

BACKGROUND ART

In general, according to the combustion scheme of an internal combustion engine, gaseous or liquefied hydrocarbon fuel is atomized by forcibly spraying the gaseous or liquefied hydrocarbon fuel into a combustion chamber of the internal combustion engine through a spray nozzle. However, the above combustion scheme has problems in that the combustion efficiency is insufficient and pollutants generated due to the incomplete combustion and contained in exhaust gas are exhausted to the atmosphere, thereby causing the air pollution.

In order to solve the above problems, many studies have been pursued to promote the combustion of fuel supplied to the internal combustion engine. One of them is to appropriately apply heat to the fuel supplied to the internal combustion engine such that the fuel can be evaporated due to the heat when the fuel is sprayed into the combustion chamber. According to the above scheme, the combustion can be promoted, the fuel supply can be reduced and the reaction with oxygen can be promoted by increasing pressure in a cylinder. However, according to the above scheme, a vehicle must be equipped with a device for applying heat to the fuel introduced into the internal combustion engine and must provide power consumed to supply the heat, so great energy consumption may be caused. In particular, the apparatus may have the complicate structure, so the installation work thereof is very difficult and the fuel consumption reduction and smoke reduction effects may be insufficient.

DISCLOSURE

Technical Problem

The present invention has been made to solve the above problems occurring in the related art, and an object of the present invention is to provide a fluid activating apparatus which have a simple structure and can activate fuel into a state to be easily burnt before the fuel is introduced into an internal combustion engine, thereby reducing fuel consumption and smoke.

Technical Solution

In order to accomplish the above object, the present invention provides a fluid activating apparatus including a case unit including a first body which has a hollow cylindrical structure with open both ends, and which has an accommodation space for providing a flow channel for passage of fluid, and which has first coupling portions formed at one end and an opposite end thereof, a second body which is arranged to cover an outer surface of the first body and which has a separation space spaced apart from a portion of the outer surface of the first body by a predetermined gap, and a first cap and a second cap which are coupled to the respective first coupling portions, and each of which has a fluid inlet port and a fluid outlet port; a magnetic force generating unit which is arranged in the accommodation space of the case unit such that the magnetic force generating unit has a central axis identical to a central axis of the first body and has a diameter smaller than a diameter of the first body, wherein the magnetic force generating unit is arranged along a flow path of the fluid to provide the fluid passing through the accommodation space with magnetic force; a support plate which is arranged in the accommodation space to support the magnetic force generating unit, and which has a mounting groove for insertion of one end of the magnetic force generating unit, and has a plurality of guide holes penetrating through one side and an opposite side thereof to guide the fluid introduced through the inlet port to the accommodation space; a magnetic force receiving unit interposed between the first body and the second body and magnetized by the magnetic force generated by the magnetic force generating unit to provide the fluid passing through the gap between an outer surface of the magnetic force generating unit and an inner surface of the first body with the magnetic force; and a heat blocking unit interposed between the magnetic force receiving unit and the second body to block heat transferred from an outside of the case unit to the accommodation space.

The magnetic force generating unit includes a plurality of permanent magnets arranged lengthwise along the case unit such that opposite magnetic poles are arranged between adjacent permanent magnets and a plurality of magnetic pieces placed among the permanent magnets, respectively, the guide holes are curved at a predetermined angle from one side to an opposite side thereof along a circumference of the support plate about the mounting groove to allow the fluid to be rotatably guided to the accommodation space.

Advantageous Effects

According to the fluid activating apparatus of the present invention, a molecular structure of water can be changed into a state to be easily absorbed into a human body by a magnetic field generated from the magnetic force generating unit and a molecular structure of liquid fuel can be changed into a state to be easily burnt, thereby reducing fuel consumption, reducing an emission of pollutants, lengthening the service life of the internal combustion engine and improving efficiency of the internal combustion engine.

BEST MODE

Mode for Invention

Hereinafter, a fluid activating apparatus according to the exemplary embodiments of the present invention will be described with reference to accompanying drawings.

Figure 1:
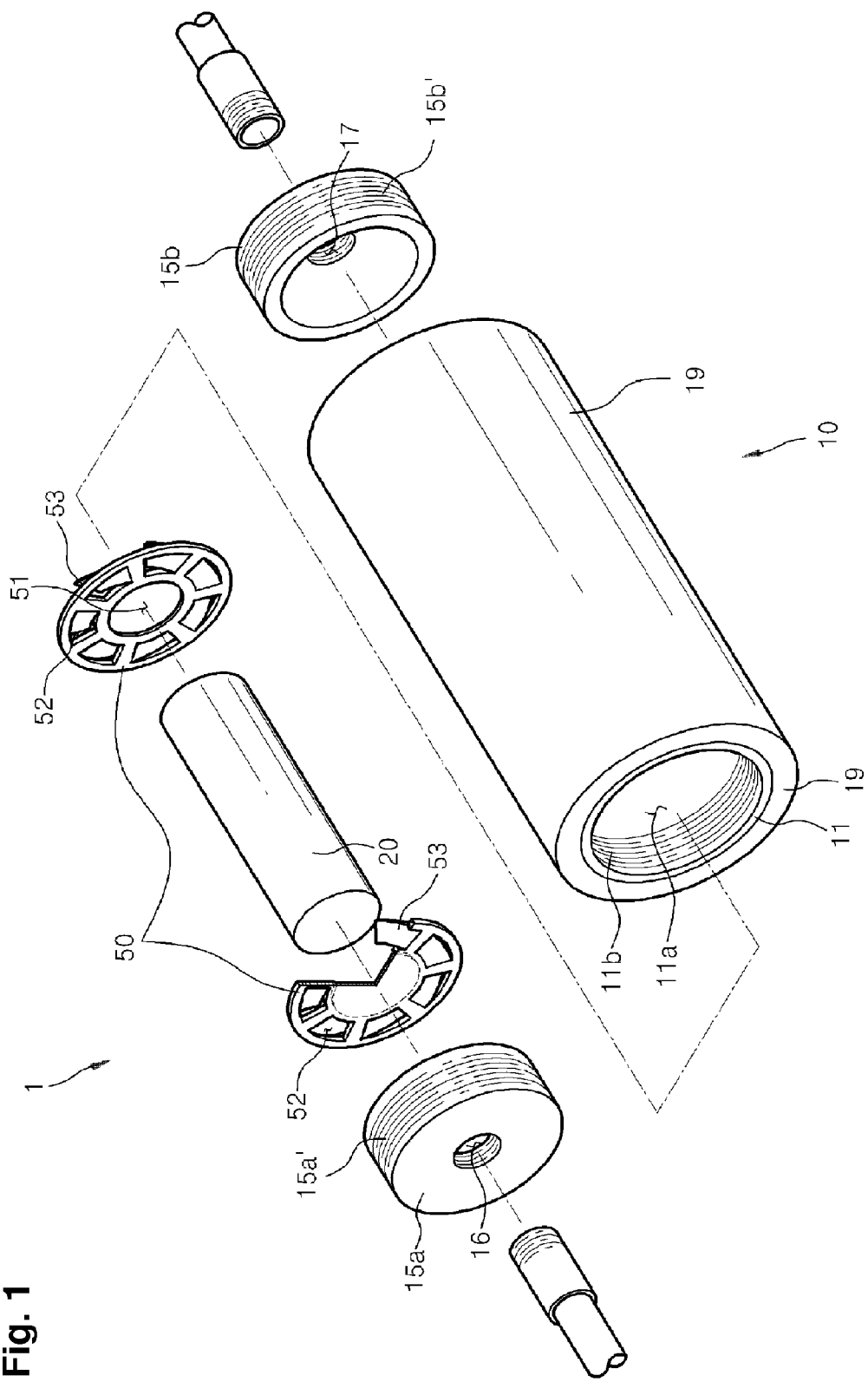
FIG. 1 is an exploded perspective view showing a fluid activating apparatus according to the first embodiment of the present invention.
Figure 2:
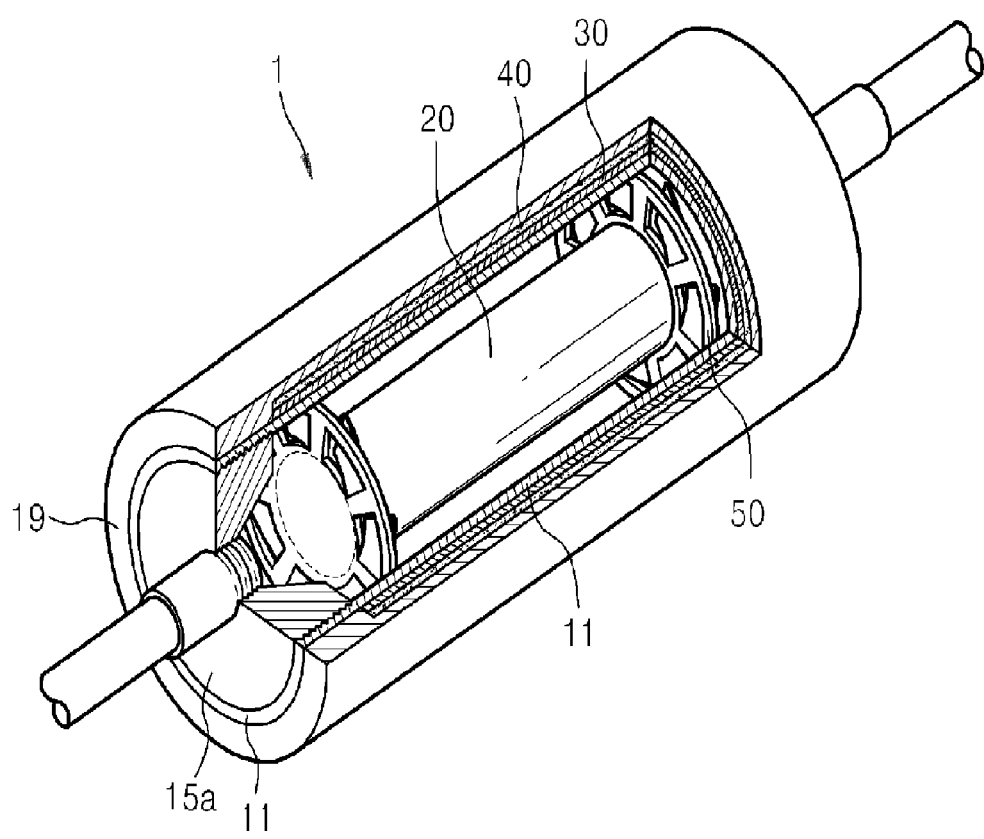
FIG. 2 is a partially-cut perspective view of the fluid activating apparatus shown in FIG. 1.
Figure 3:
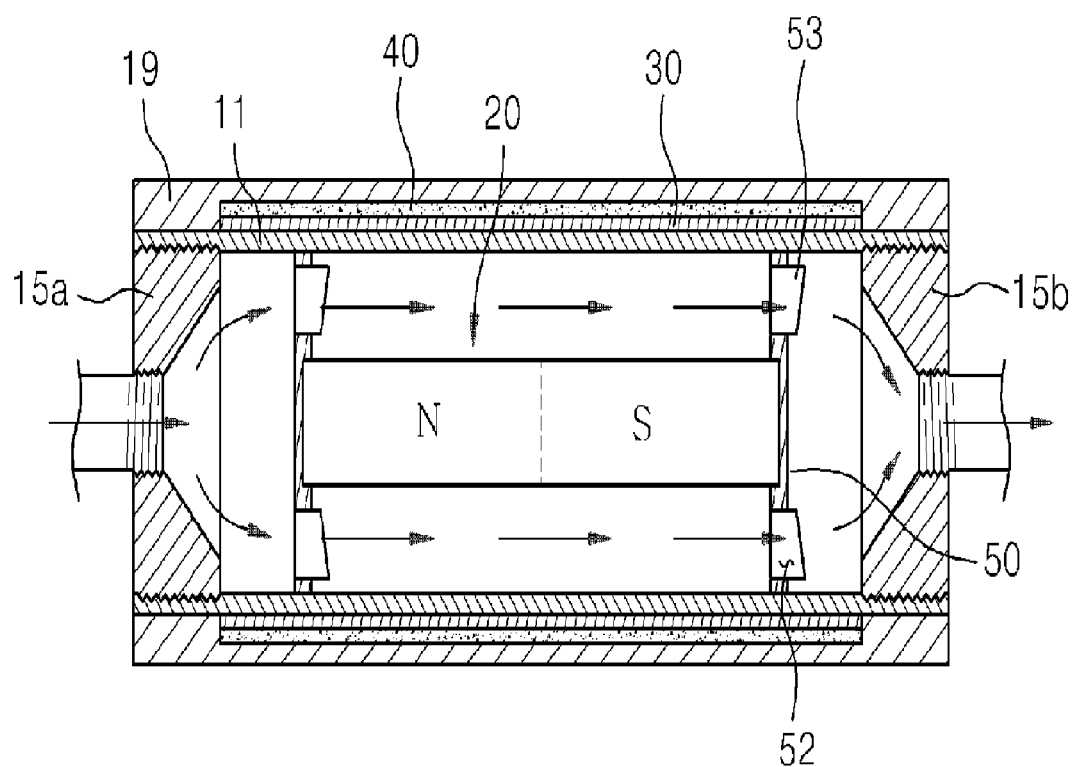
FIG. 3 is a sectional view of the fluid activating apparatus shown in FIG. 1.

FIGS. 1 to 3 show the fluid activating apparatus according to the present invention. Referring to FIGS. 1 to 3, the fluid activating apparatus 1 includes a case unit 10, a magnetic force generating unit 20, a heat blocking unit 30, a magnetic force receiving unit 40 and support plates 50.

The case unit 10 includes a first body 11, a second body 19, and a cap member having first and second caps 15a and 15b coupled to both ends of the first body 11.

The first body 11 has a hollow cylindrical structure and both ends thereof are open. The first body 11 is formed therein with an accommodation space 11a serving as a passage of the fluid and is provided at inner surfaces of both ends thereof with first coupling portions 11b in the form of female screws. Preferably, the first body 11 is made from a high-strength material such that the first body 11 can be prevented from being deformed by pressure.

The second body 19 is fixed to the first body 11 to surround the outer surface of the first body 11. The second body 19 has a separation space which is spaced apart from a portion of the outer surface of the first body 11 such that the magnetic force receiving unit 40 and the heat blocking unit 30 can be installed in the separation space.

The cap member is coupled to the first coupling portions 11a provided at both ends of the first body 11. Although the first and second caps 15a and 15b have the same structure and shape, they will be expressed as the first and second caps 15a and 15b, respectively, for the purpose of convenience of explanation.

The first cap 15a is formed with a fluid inlet port 16 and provided at an outer surface thereof with a first screw section 15a' in the form of a male screw such that the first cap 15a can be screw coupled into the first coupling portion 11a formed at one side of the first body 11.

The second cap 15b is formed with a fluid outlet port 17 to supply the fluid, which is introduced through the fluid inlet port 16, into the internal combustion engine and is provided at an outer surface thereof with a second screw section 15b' in the form of a male screw such that the second cap 15b can be screw coupled into the first coupling portion 11a formed at the other side of the first body 11.

The fluid inlet port 16 and the fluid outlet port 17 of the first and second caps 15a and 15b have tapered structures such that diameters thereof can be gradually increased from one side to the other side thereof. In addition, screws are formed at portions of inner walls of the fluid inlet port 16 and the fluid outlet port 17 so that the fluid inlet port 16 and the fluid outlet port 17 can be screw coupled with a fluid supply pipe or a fluid discharge pipe.

The magnetic force generating unit 20 is supported by the support plate 50 and installed in the accommodation space 11a to supply magnetic force to the fluid.

The support plate 50 has a disc shape having a diameter smaller than that of the first body 11 and is provided at the center thereof with a mounting groove 51 which is recessed by a predetermined depth such that an end portion of the magnetic force generating unit 20 can be partially inserted into the mounting groove 51. The support plate 50 is formed at an outer peripheral portion thereof with a plurality of guide holes 52 which are spaced part from each other by a predetermined distance in the circumferential direction about the mounting groove 51.

A guide piece 53 is provided at an outer peripheral portion of each guide hole 52 to guide the fluid in such a manner that the fluid passing through the guide hole 52 can be rotatably introduced into the accommodation space 11a. The fluid passing through the guide hole 52 may be introduced into the accommodation space 11a in the form of a swirl flow by the guide piece 53.

As shown in the drawings, the guide hole 52 is curved at a predetermined angle from one side to an opposite side thereof along a circumference of the support plate about the mounting groove 51 to allow the fluid, which is introduced through the fluid inlet port 16, to be rotatably guided to the accommodation space 11a along an outer peripheral surface of the magnetic force generating unit 20. Otherwise, the guide hole 52 can be formed by perforating the support plate 50 in the direction parallel to the length direction of the first body 11.

The fluid introduced through the fluid inlet port 16 passes through the guide hole 52 and then flows out of the case unit 10 through the fluid outlet port 17 via the accommodation space 11a.

The magnetic force generating unit 20 is positioned at the center of the first body 11 in a state that the magnetic force generating unit 20 is inserted into the mounting groove 51 of the support plate 50. At this time, the magnetic force generating unit 20 may float without making contact with an inner surface of the first body so that the magnetic field generated from the magnetic force generating unit 20 can be uniformly distributed in the accommodation space 11a.

As shown in FIG. 3, the magnetic force generating unit 20 is equipped with permanent magnets in which magnetic poles of the permanent magnets are arranged in the direction the same as the length direction of the first body 11.

The magnetic force generating unit 20 may have permanent magnets including rare earth metal compounds having rare earth elements that represent strong magnetic force, such as Nd—Fe—B magnet or Sm—Co magnet.

The heat blocking unit 30 is interposed between the first body 11 and the second body 19 to prevent the heat from being transferred from the outside of the second body 19 to the fluid and the magnetic force generating unit 20 through the body 11.

Figure 5:
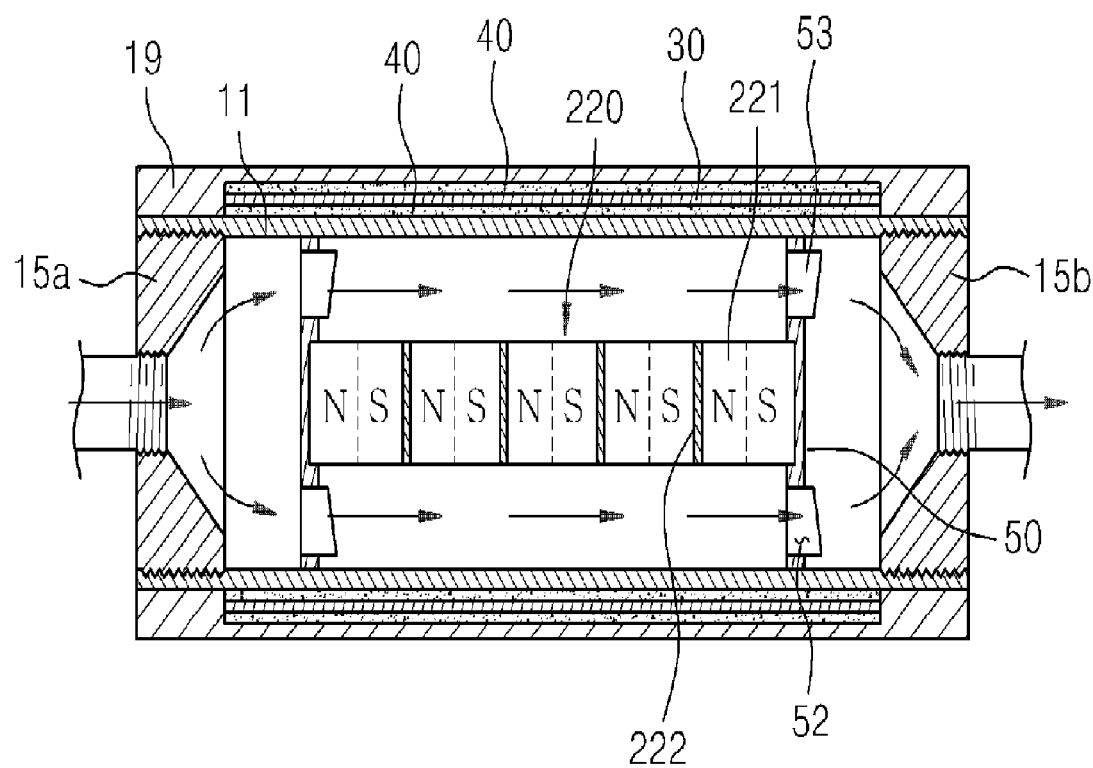
FIG. 5 is a sectional view showing a fluid activating apparatus according to the third embodiment of the present invention.
Figure 6:
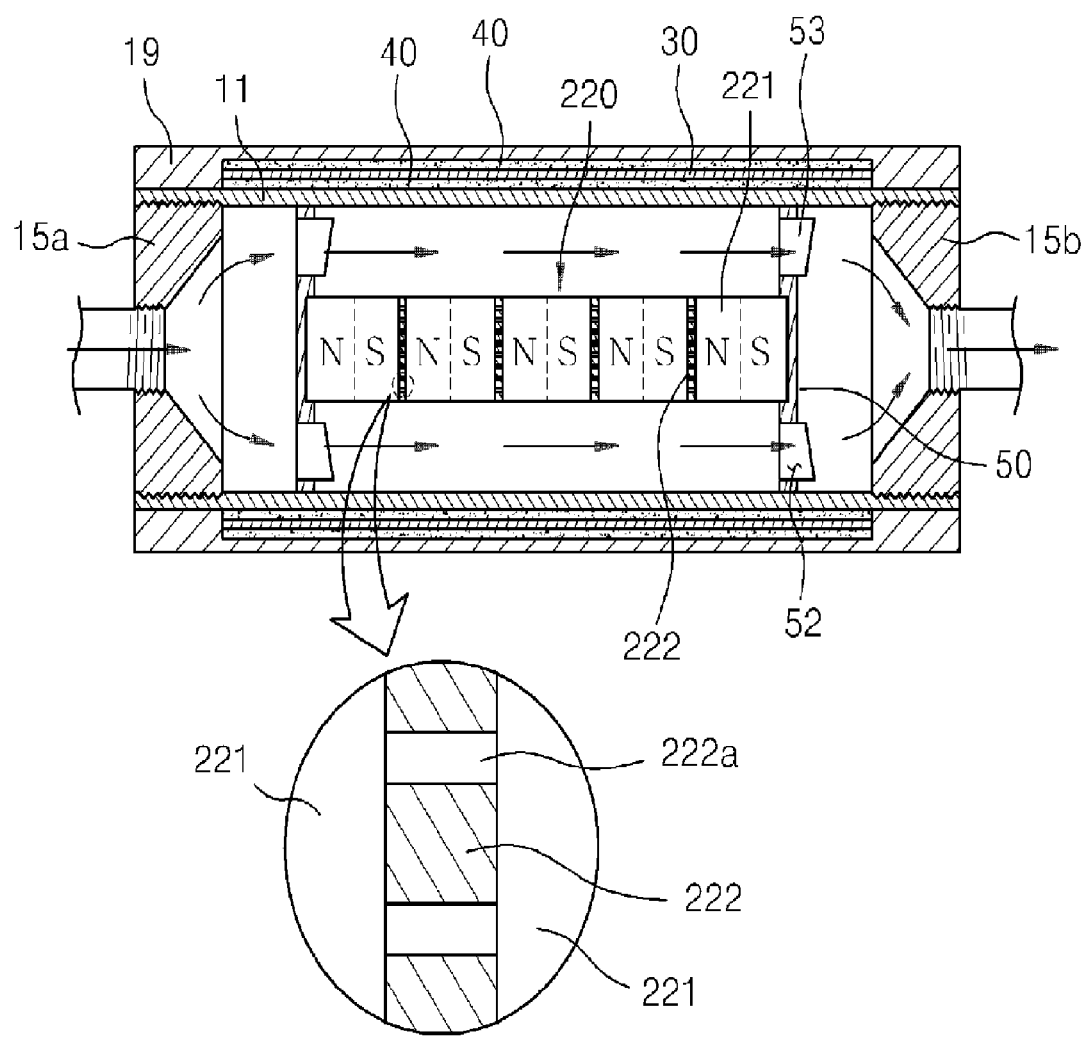
FIG. 6 is a sectional view showing a fluid activating apparatus according to the fourth embodiment of the present invention.
Figure 7:
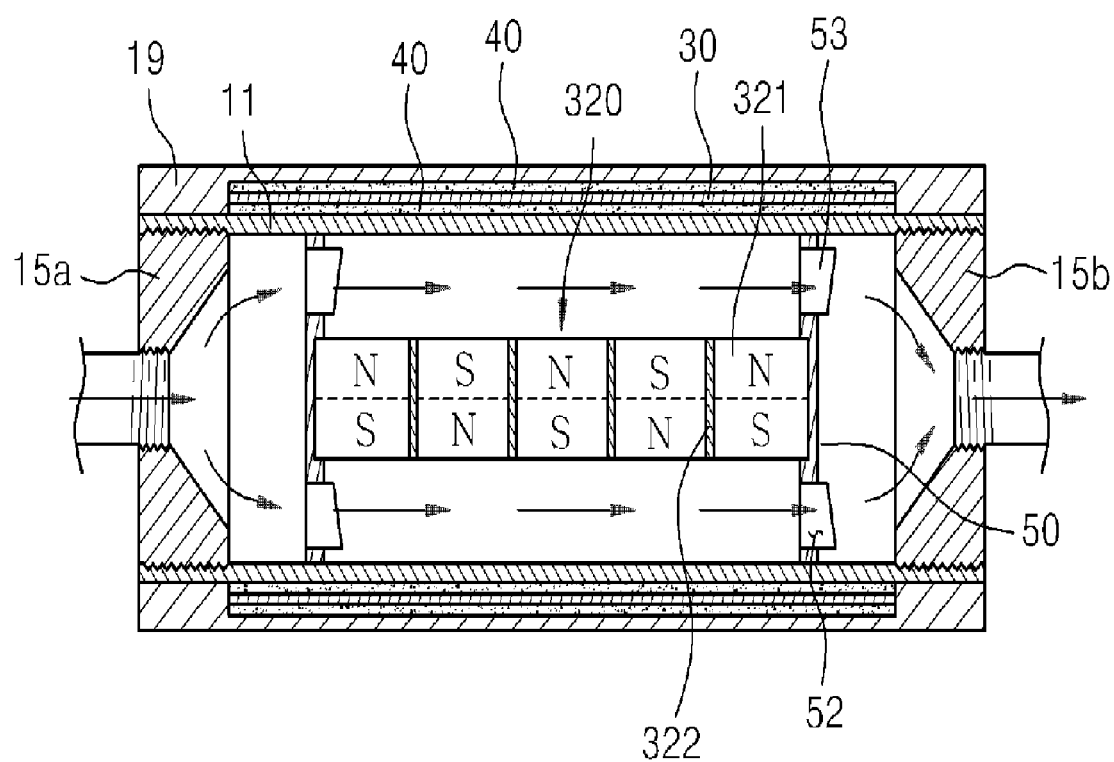
FIG. 7 is a sectional view showing a fluid activating apparatus according to the fifth embodiment of the present invention.

As shown in FIGS. 1 to 3, the heat blocking unit 30 can be formed between the magnetic force receiving unit 40 and the second body 19. Otherwise, as shown in FIGS. 5 to 7, the heat blocking unit 30 may have the dual structure surrounding upper and lower portions of the magnetic force receiving unit 40.

The magnetic force receiving unit 40 is installed between the first and second bodies 11 and 19 to receive the magnetic force generated from the magnetic force generating unit 20. The magnetic force receiving unit 40 may be adjacent to the first body 11 or may be spaced apart from the first body 11 by the heat blocking unit 30.

Preferably, the magnetic force receiving unit 40 includes a ferromagnetic material, such as Fe, Ni or Co, which is magnetized in the direction same as the direction of the magnetic field when it is subject to the magnetic field generated from the magnetic force generating unit 20.

In addition, the magnetic force receiving unit 40 may include permanent magnets. In this case, preferably, the magnetic force receiving unit 40 has the arrangement of magnetic poles opposite to the arrangement of magnetic poles of the magnetic force generating unit 20. That is, preferably, opposite magnetic poles are arranged while facing each other. In this case, the magnetic force receiving unit 40 can provide the magnetic force the same as that of the magnetic force generating unit 20.

Figure 4:
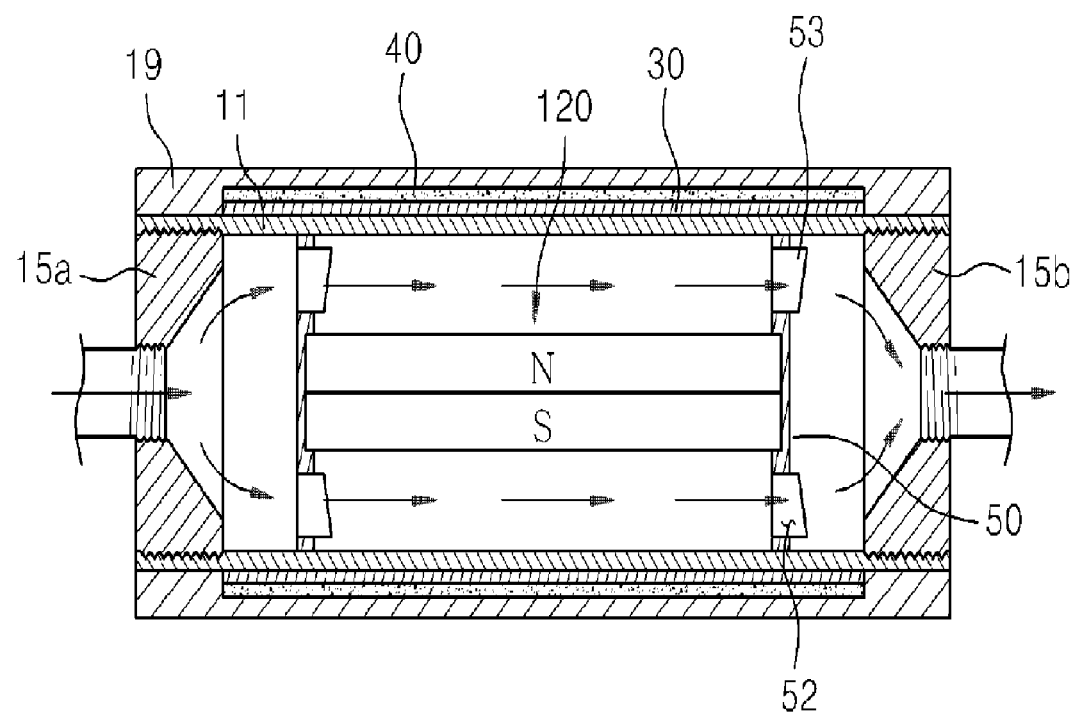
FIG. 4 is a sectional view showing a fluid activating apparatus according to the second embodiment of the present invention.

Meanwhile, as shown in FIG. 4, the magnetic force generating unit 120 may include permanent magnets where magnetic poles are arranged in the vertical direction perpendicular to the length direction of the first body 11.

In addition, as shown in FIGS. 5 and 6, the magnetic force generating unit 220 may include a plurality of permanent magnets 221 where magnetic poles are arranged in the direction parallel to the length direction of the first body 11 and the permanent magnets 221 are sequentially arranged in the direction parallel to the length direction of the first body 11.

Referring to FIGS. 5 and 6, the permanent magnets 221 are arranged such that opposite magnetic poles are placed between adjacent permanent magnets 221, in which a first magnetic piece 222 is interposed between the permanent magnets 221 to form a magnetic path.

The first magnetic piece 222 is magnetized in the direction corresponding to the length direction of the magnetic force generating unit 220 by the magnetic field generated due to the magnetic poles of the permanent magnets 221 arranged to have polarities opposite to each other, thereby forming the magnetic path.

The permanent magnets 221 and the first magnetic pieces 222 are alternately arranged and bonded with each other by pressing them in the arrangement direction.

The first magnetic pieces 222 are formed with a plurality of through holes 222a directed toward the permanent magnets 221, which are adjacent to each other in the length direction of the first body 11, in order to adjust intensity of the magnetic force generated from the magnetic force generating unit 220.

The diameter of the through hole 222a can be varied to adjust the intensity of the magnetic force of the magnetic force generating unit 220.

Meanwhile, FIG. 7 shows a magnetic force generating unit according to another embodiment of the present invention. Referring to FIG. 7, the magnetic force generating unit 320 may include a plurality of permanent magnets 321 where magnetic poles are arranged in the direction perpendicular to the length direction of the first body 11 and the permanent magnets 221 are sequentially arranged in the direction parallel to the length direction of the first body 11.

Referring to FIG. 7, the permanent magnets 321 are arranged such that opposite magnetic poles are placed between adjacent permanent magnets 321, in which a second magnetic piece 322 is interposed between the permanent magnets 321 to form a magnetic path.

The second magnetic piece 322 is magnetized in the direction corresponding to the direction of the magnetic force generated due to the magnetic poles of the permanent magnets 321 arranged to have polarities opposite to each other in the length direction of the first body 11 and the vertical direction perpendicular to the first body 11, thereby forming the magnetic path serving as a passage of the magnetic force of the adjacent permanent magnets 321.

The permanent magnets 321 and the second magnetic pieces 322 are alternately arranged and bonded with each other by pressing them in the arrangement direction.

The first and second magnetic pieces 222 and 322 include magnetic members which are magnetized in the direction identical to or opposite to the direction of the magnetic field when the magnetic members are exposed to the magnetic field.

As shown in FIGS. 4 and 7, the magnetic force generating units 120, 220 and 320, which are obtained by bonding a plurality of permanent magnets in the length direction of the first body 11, have the structure capable of changing the direction of the magnetic field by several times or tens of times through the change of the magnetic poles while the fluid is passing through the accommodation space 11a, so that the activation degree of the fuel can be improved.

As described above, the fluid activating apparatus according to the present invention includes the magnetic force generating unit having the permanent magnets, which are arranged lengthwise along the case unit such that opposite magnetic poles are placed adjacent to each other, so the fluid introduced through the fluid inlet port is exposed to the magnetic field generated from the magnetic force generating unit. At this time, the direction of the magnetic field generated from the magnetic force generating unit may be changed several times in the length direction of the magnetic force generating unit due to the configuration of the permanent magnets where opposite magnetic poles are placed between adjacent permanent magnets. Thus, when the fluid passing through the accommodation space is fuel, the molecular bonding structure of the fuel is changed into a state to be easily burnt. In addition, when the fluid passing through the accommodation space is water, the water is pulverized into fine particles easily absorbed in the human body.

Meanwhile, since the guide holes are curved to allow the fluid to flow along the outer peripheral surface of the magnetic force generating unit, the fluid may pass through the accommodation space for a long time while being exposed to the magnetic field the direction of which is continuously changed.

Although embodiments of the fluid activating apparatus according to the present invention have been described with reference to accompanying drawings, those skilled in the art may comprehend that the embodiments are illustrative purpose only and various modifications and equivalents may be possible within the technical scope of the present invention.

Therefore, the protective right of the present invention should be defined based on the technical features of the claims attached hereto.

The invention claimed is:

1. A fluid activating apparatus comprising:
a case unit including a first body which has a hollow cylindrical structure with open both ends, and which has an accommodation space for providing a flow channel for passage of fluid, and which has first coupling portions formed at one end and an opposite end thereof, a second body which is arranged to cover an outer surface of the first body and which has a separation space spaced apart from a portion of the outer surface of the first body by a predetermined gap, and a first cap and a second cap which are coupled to the respective first coupling portions, and each of which has a fluid inlet port and a fluid outlet port;
a magnetic force generating unit which is arranged in the accommodation space of the case unit such that the magnetic force generating unit has a central axis identical to a central axis of the first body and has a diameter smaller than a diameter of the first body, wherein the magnetic force generating unit is arranged along a flow path of the fluid to provide the fluid passing through the accommodation space with magnetic force;
a support plate which is arranged in the accommodation space to support the magnetic force generating unit, and which has a mounting groove for insertion of one end of the magnetic force generating unit, and has a plurality of guide holes penetrating through one side and an opposite side thereof to guide the fluid introduced through the inlet port to the accommodation space;

a magnetic force receiving unit interposed between the first body and the second body and magnetized by the magnetic force generated by the magnetic force generating unit to provide the fluid passing through the gap between an outer surface of the magnetic force generating unit and an inner surface of the first body with the magnetic force; and a heat blocking unit interposed between the magnetic force receiving unit and the second body to block heat transferred from an outside of the case unit to the accommodation space, wherein the guide holes are curved at a predetermined angle from one side to an opposite side thereof along a circumference of the support plate about the mounting groove to allow the fluid to be rotatably guided to the accommodation space.

2. The fluid activating apparatus of claim 1, wherein the magnetic force generating unit comprises a plurality of permanent magnets arranged lengthwise along the case unit such that opposite magnetic poles are arranged between adjacent permanent magnets and a plurality of magnetic pieces placed among the permanent magnets, respectively.

* * * * *